US010105890B2

(12) United States Patent
Kelly

(10) Patent No.: US 10,105,890 B2
(45) Date of Patent: Oct. 23, 2018

(54) MODULAR WALL SYSTEM

(71) Applicant: Kevin P. Kelly, Radnor, PA (US)

(72) Inventor: Kevin P. Kelly, Radnor, PA (US)

( * ) Notice: Subject to any disclaimer, the term of this patent is extended or adjusted under 35 U.S.C. 154(b) by 101 days.

(21) Appl. No.: 14/737,439

(22) Filed: Jun. 11, 2015

(65) Prior Publication Data

US 2015/0275542 A1 Oct. 1, 2015

Related U.S. Application Data

(63) Continuation-in-part of application No. 13/662,178, filed on Oct. 26, 2012, which is a continuation of
(Continued)

(51) Int. Cl.

| | |
|---|---|
| *B29C 51/16* | (2006.01) |
| *E04C 1/39* | (2006.01) |
| *E04C 2/52* | (2006.01) |
| *E04B 2/02* | (2006.01) |
| *E04B 2/72* | (2006.01) |
| *B41M 5/00* | (2006.01) |

(Continued)

(52) U.S. Cl.
CPC .......... *B29C 51/16* (2013.01); *B41M 5/0005* (2013.01); *B44C 5/0453* (2013.01); *E04B 2/02* (2013.01); *E04B 2/72* (2013.01); *E04C 1/397* (2013.01); *E04C 2/52* (2013.01); *E04H 17/1404* (2013.01); *E04H 17/168* (2013.01); *B29K 2055/02* (2013.01); *B29L 2031/10* (2013.01); *E04B 2002/0256* (2013.01); *E04H 2017/1456* (2013.01)

(58) Field of Classification Search
CPC ..... B29C 51/16; B44C 5/0453; E04H 17/168; E04H 17/1404; E04H 2017/1456; B41M 5/0005; E04C 2/52; E04C 1/397; E04B 2/72; E04B 2/02; E04B 2002/0256; B29L 2031/10; B29K 2055/02
See application file for complete search history.

(56) References Cited

U.S. PATENT DOCUMENTS

| | | | |
|---|---|---|---|
| 3,130,113 A | | 4/1964 | Silman |
| 3,694,296 A | * | 9/1972 | Frontino .................. B44C 1/18 156/71 |

(Continued)

FOREIGN PATENT DOCUMENTS

EP 569921 A1 11/1993

OTHER PUBLICATIONS

Sep. 6, 2011, U.S. Appl. No. 12/162,816, Non-Final Office Action.
(Continued)

*Primary Examiner* — Joshua K Ihezie
(74) *Attorney, Agent, or Firm* — Schott, P.C.

(57) ABSTRACT

A modular exterior and interior panel, wall and divider system is provided. The modular wall system includes a support base, a plurality of horizontal two-sided panels, each having opposite vertical edges, and a plurality of vertical members secured to the support base. Each of the vertical members has at least one groove for receiving the opposite vertical edges of the horizontal panels. A decorative layer is applied on at least the exterior surfaces of the horizontal panels and the vertical members.

9 Claims, 17 Drawing Sheets

Related U.S. Application Data application No. 12/162,816, filed on Sep. 23, 2009, and a continuation-in-part of application No. PCT/US2007/002615, filed on Jan. 31, 2007, now abandoned.

(60) Provisional application No. 60/763,793, filed on Jan. 31, 2006.

(51) Int. Cl.
*E04H 17/14* (2006.01)
*E04H 17/16* (2006.01)
*B44C 5/04* (2006.01)
*B29L 31/10* (2006.01)
*B29K 55/02* (2006.01)

(56) References Cited

U.S. PATENT DOCUMENTS

| | | | |
|---|---|---|---|
| 3,783,968 A | | 1/1974 | Derry |
| 4,604,312 A | * | 8/1986 | Creighton ............ D06N 7/0007 156/252 |
| 4,698,945 A | | 10/1987 | Munn |
| 4,742,657 A | * | 5/1988 | Veech .................... E04B 2/705 403/294 |
| 5,361,556 A | | 11/1994 | Menchetti |
| 5,404,685 A | | 4/1995 | Collins |
| 5,465,541 A | | 11/1995 | Lin et al. |
| 5,480,126 A | | 1/1996 | Teasdale |
| 5,501,057 A | | 3/1996 | Dawson |
| 5,519,971 A | | 5/1996 | Ramirez |
| 6,029,954 A | | 2/2000 | Murdaca |
| 6,045,880 A | * | 4/2000 | Minichiello ........ B42F 13/0013 156/234 |
| 6,131,365 A | | 10/2000 | Crockett |
| 6,141,928 A | | 11/2000 | Platt |
| 6,298,619 B1 | | 10/2001 | Davie |
| 6,346,312 B1 | * | 2/2002 | Billoni ................... B44C 1/10 427/149 |
| 6,349,516 B1 | | 2/2002 | Powell et al. |
| 6,434,900 B1 | | 8/2002 | Masters |
| 6,442,913 B1 | | 9/2002 | Mann |
| 6,584,742 B1 | | 7/2003 | Kligler et al. |
| 6,627,284 B1 | * | 9/2003 | Naidj ....................... B32B 5/18 40/594 |
| 6,685,172 B2 | | 2/2004 | Jolliffe |
| 6,748,997 B2 | | 6/2004 | Fricano et al. |
| 6,821,058 B1 | | 11/2004 | Dawson |
| 7,143,556 B2 | | 12/2006 | Hales |
| 7,461,489 B2 | | 12/2008 | Herbertsson |
| 7,635,416 B1 | * | 12/2009 | Hansen .................... B44C 5/00 156/293 |
| 2002/0142155 A1 | * | 10/2002 | Steinberg ................ B44C 1/105 428/343 |
| 2003/0041962 A1 | * | 3/2003 | Johnson .................. B32B 27/08 156/266 |
| 2005/0072097 A1 | | 4/2005 | Holloway |
| 2005/0263093 A1 | * | 12/2005 | Rosen .................. G09F 15/0025 119/524 |
| 2006/0097237 A1 | | 5/2006 | McGregor |
| 2006/0248825 A1 | | 11/2006 | Garringer |
| 2006/0254167 A1 | | 11/2006 | Antonic |
| 2007/0054595 A1 | * | 3/2007 | Pinto ....................... G09F 19/00 446/482 |
| 2008/0178550 A1 | * | 7/2008 | Pierzynski ............ B29C 33/424 52/554 |
| 2008/0233834 A1 | * | 9/2008 | Pinto ....................... G09F 19/00 446/482 |
| 2009/0180712 A1 | * | 7/2009 | Pollack .................... B29C 51/00 382/285 |
| 2010/0023155 A1 | * | 1/2010 | Conrad ................ B29C 33/3835 700/119 |
| 2015/0239285 A1 | * | 8/2015 | Romero .................... B44C 5/00 40/800 |

OTHER PUBLICATIONS

Apr. 26, 2012, U.S. Appl. No. 12/162,816, Final Office Action.
Apr. 17, 2014, U.S. Appl. No. 13/662,178, Non-Final Office Action.
Dec. 12, 2014, U.S. Appl. No. 13/662,178, Final Office Action.

* cited by examiner

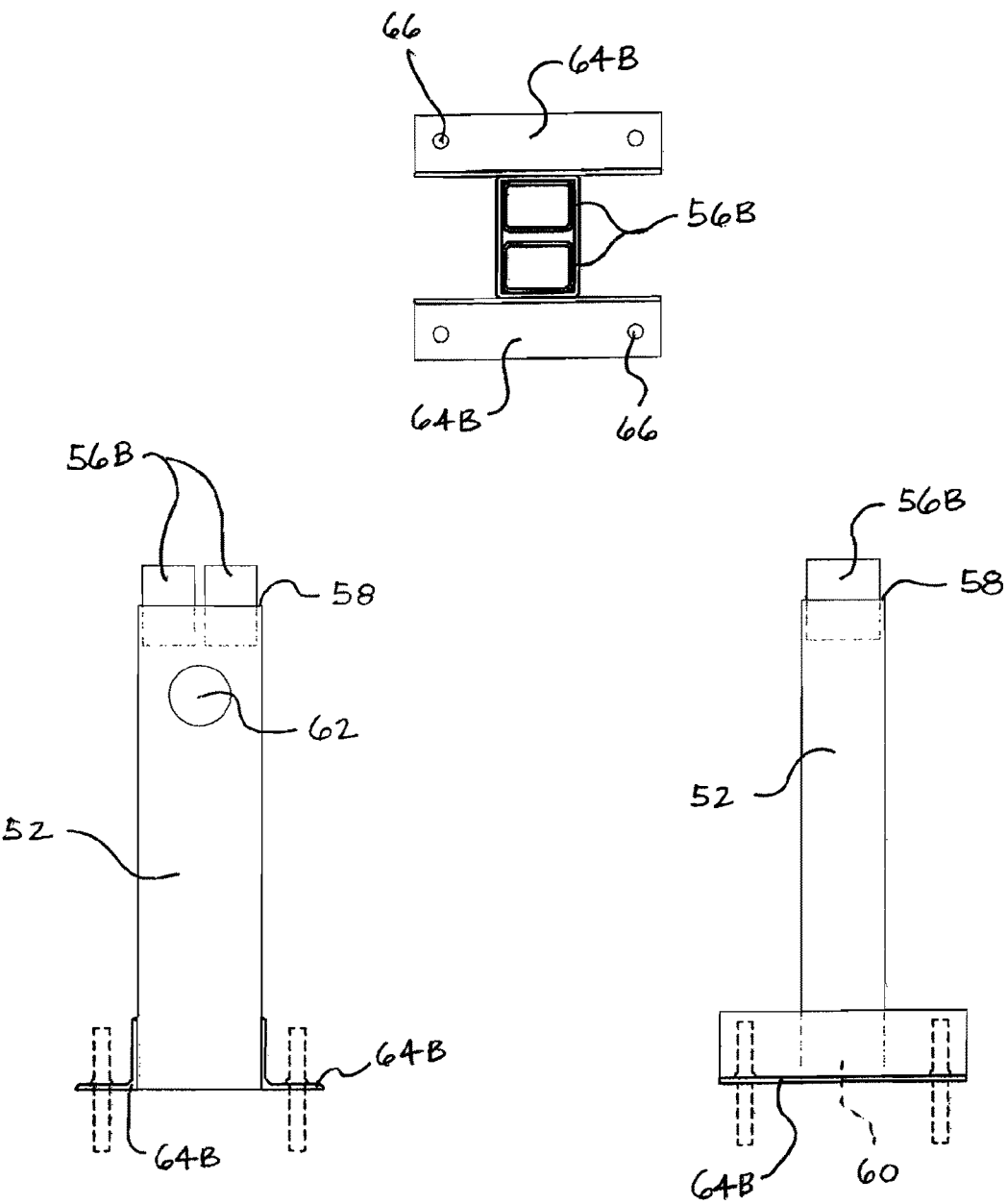

MODULAR WALL SYSTEM

BACKGROUND

Conventional concrete-like barriers such as those used for fencing or privacy-walls as part of a landscaping scheme are typically composed of pre-cast concrete, hand-laid concrete block, or hand-laid or poured concrete. Such walls often have exterior surfaces comprised of stone, aggregate, brick, stucco, rock, marble, or other natural materials. The labor and expense of building and maintaining these conventional concrete-like barriers is considerable. Further to the considerable expense, the physical properties of such barriers (e.g., their substantial weight) make them virtually "permanent" structures.

Accordingly, there remains a need for an improved fencing or privacy-wall system with a natural-looking facade that is easy to install and maintain, versatile (e.g., the material appearance can be easily changed, as desired), and cost effective.

SUMMARY

The present invention provides a modular wall system for use in exterior fence or structural walls, including a support base, a plurality of horizontal panels, each having opposite vertical edges, and a plurality of vertical members secured to the support base. Each of the vertical members has at least one groove for receiving opposite vertical edges of the horizontal panels. A decorative layer is applied on at least the exterior surfaces of the horizontal panels and the vertical members.

The present invention also provides a method of constructing a modular wall system. A concrete footing is poured and a plurality of bolts is set within the concrete footing. At least two structural vertical members are secured to the concrete footing via the bolts. The structural vertical members are covered with a plurality of pilaster panels, thereby forming at least two vertical members. Opposite edges of at least one horizontal panel are interlocked with respective grooves of pilaster panels of adjacent vertical members.

BRIEF DESCRIPTION OF THE DRAWINGS

FIG. 15 is a side elevation of a structural vertical member of the vertical member of FIG. 12 showing two bayonet projections at an upper end thereof and horizontal flanges at a bottom end thereof;

FIG. 16 is an end plan view of the structural vertical member of FIG. 15;

FIG. 17 is a plan view of the structural vertical member of FIG. 16;

DETAILED DESCRIPTION OF THE PREFERRED EMBODIMENTS

Figure 1:
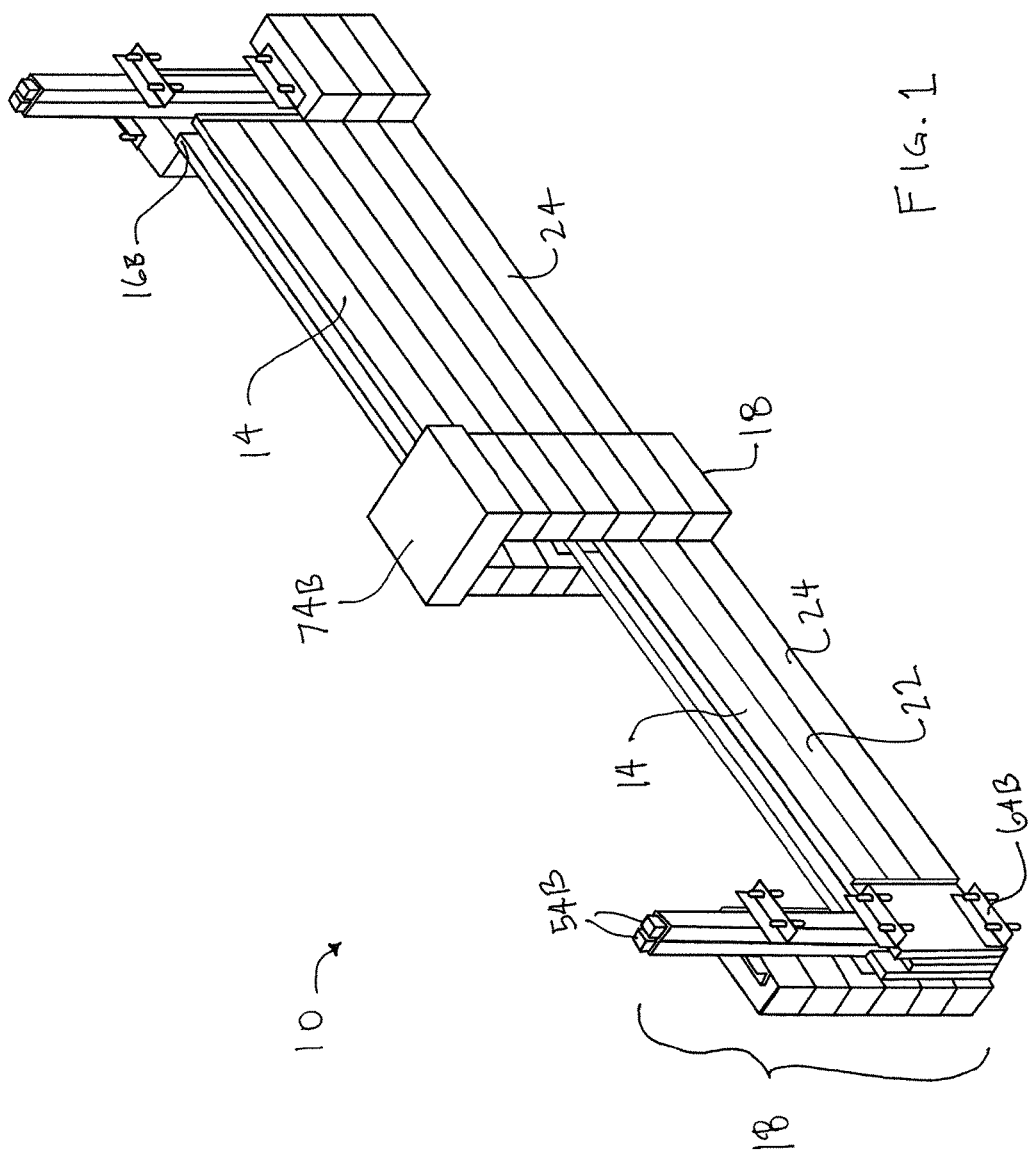
FIG. 1 is a perspective view of a modular wall section in accordance with the present invention.

Certain terminology is used in the following description for convenience only and is not considered limiting. Words such as "front," "back," "top," and "bottom" designate directions in the drawings to which reference is made. This terminology includes the words specifically noted above, derivatives thereof, and words of similar import. Additionally, the terms "a" and "one" are defined as including one or more of the referenced item unless specifically noted. The phrase "at least one of" followed by a list of two or more items, such as A, B, or C, means any individual one of A, B, or C, as well as any combination thereof.

Referring generally to FIGS. 1-28, the modular wall system 10 includes a support base 12, a plurality of horizontal panels 14, each having opposite vertical edges 16A, 16B, and a plurality of vertical members 18 secured to the support base 12. Each of the vertical members 18 has at least one groove 20 for receiving the opposite vertical edges 16A, 16B of the horizontal panels 14. A decorative layer 22 is affixed on the exterior surfaces 24 of the horizontal panels 14 and the vertical members 18.

The horizontal panels 14, which may be as 12" thick, may be integrated and installed within and by using conventional wall and fence pilasters or existing vertical members so that the decorative panels can be used as a "stand-alone" member with existing wall and fence systems.

Figure 2:
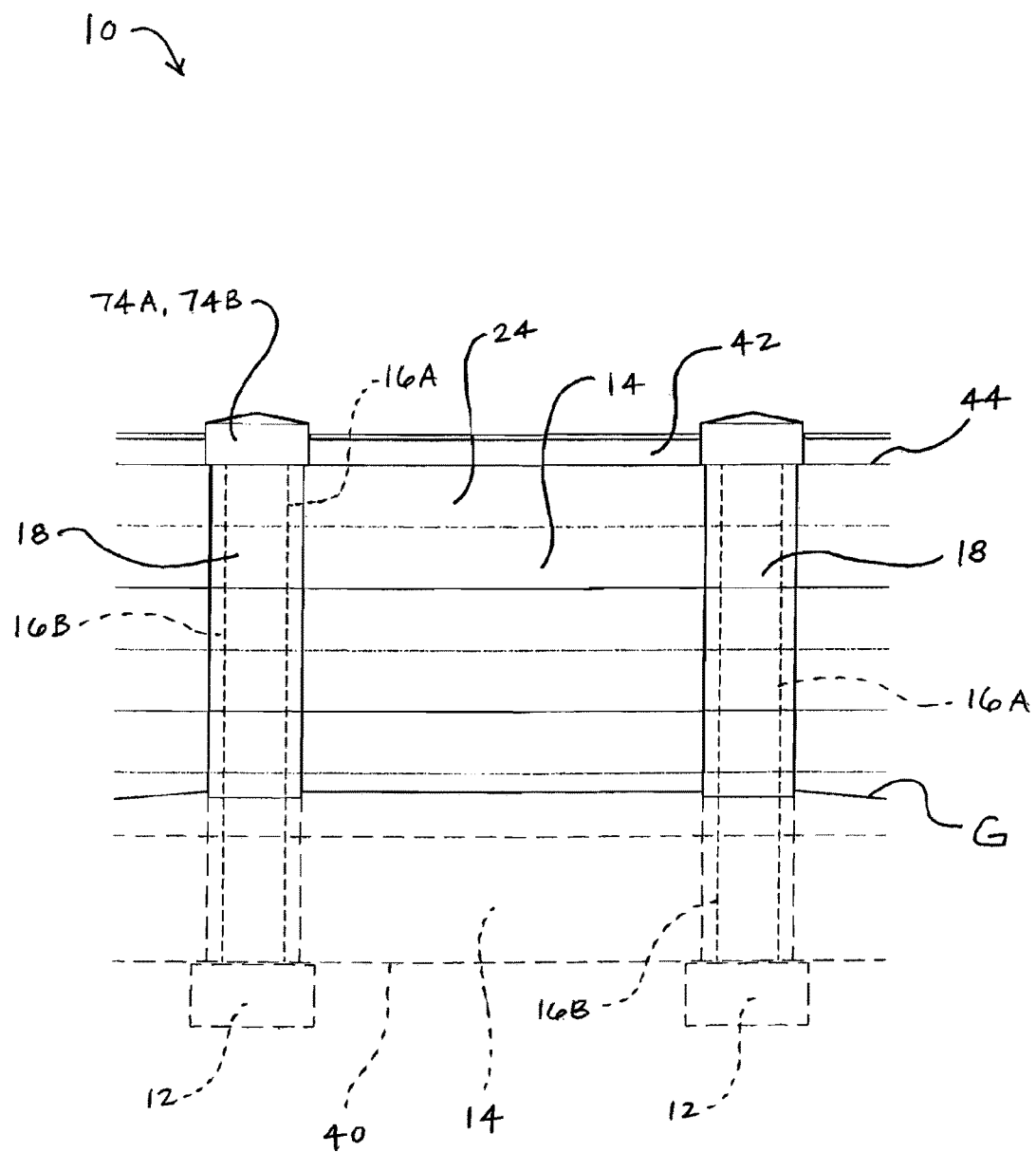
FIG. 2 is a front elevation of a modular wall section in accordance with the present invention.

FIG. 1 illustrates, among other things, the stackability of the horizontal panels 14, as will be discussed in greater detail below. FIG. 2 represents a modular wall system relative to ground level G.

Figure 4:
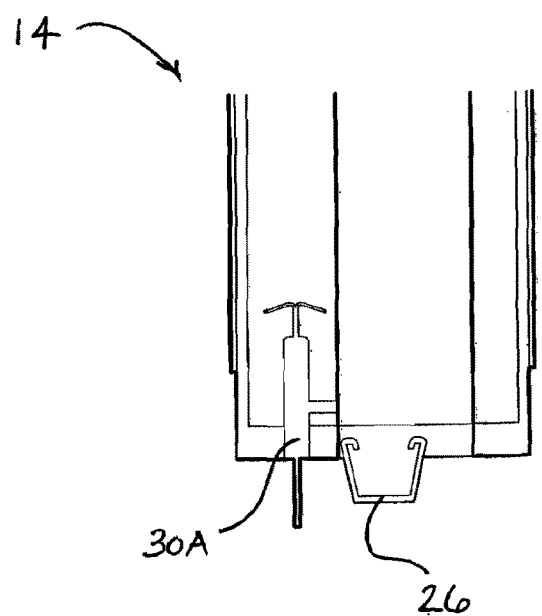
FIG. 4 is a plan section view of the horizontal panel of FIG. 3.
Figure 3:
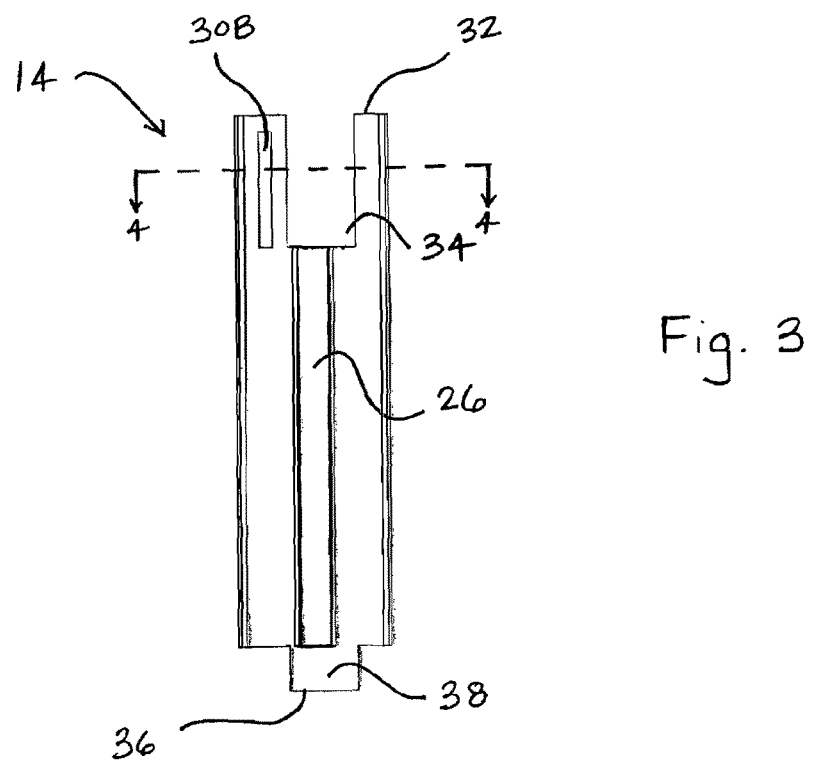
FIG. 3 is an end elevation of a horizontal panel of the modular wall system showing a tongue and a component of an off-center fastening device in accordance with the present invention.
Figure 6:
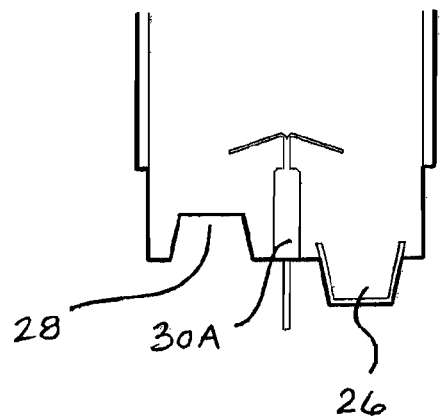
FIG. 6 is a plan section view of the horizontal panel of FIG. 5.
Figure 5:
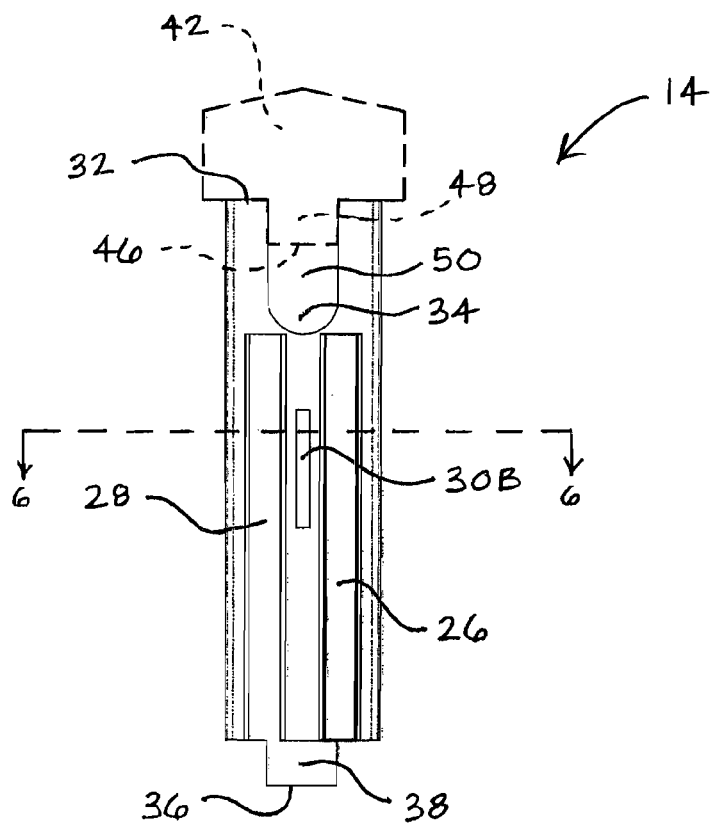
FIG. 5 is an end elevation of a horizontal panel of the modular wall system showing a tongue, a groove, and a component of a centered fastening device in accordance with the present invention.
Figure 8:
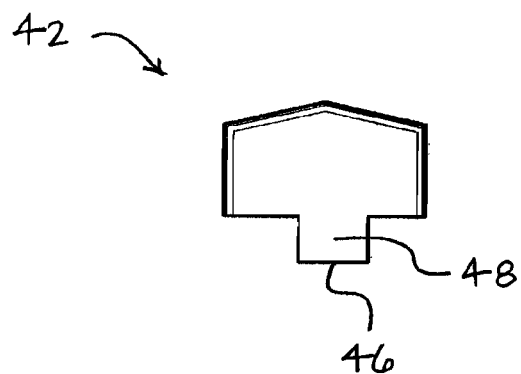
FIG. 8 is a section view of a horizontal cap for covering an upper edge of the modular wall system as represented in phantom in FIG. 7.
Figure 7:
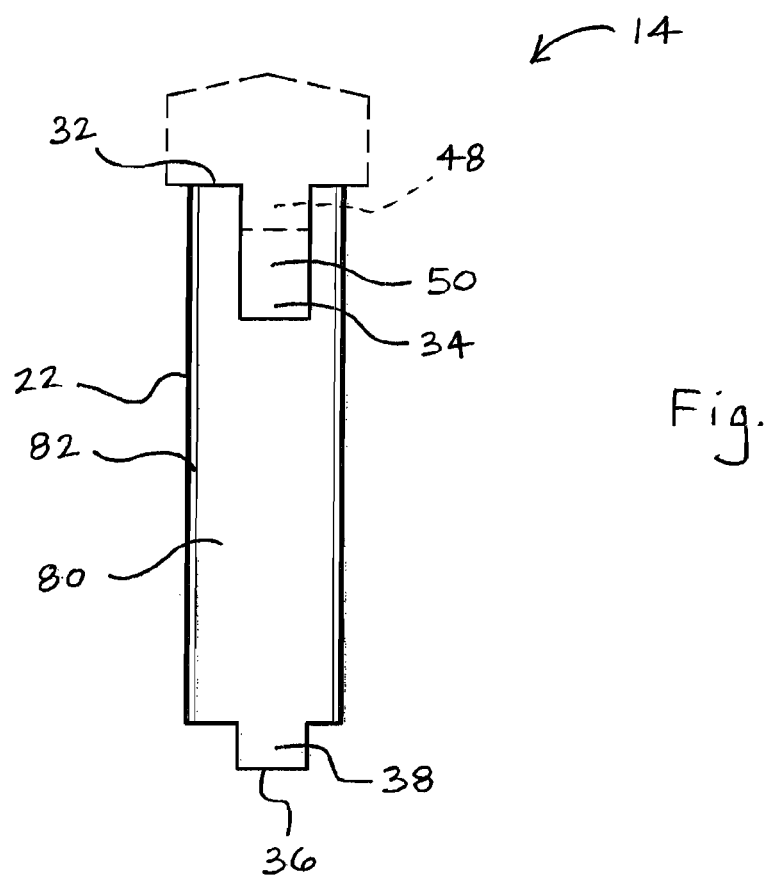
FIG. 7 is a section view of a horizontal panel of the modular wall system showing a squared keyway and a key in accordance with the present invention.
Figure 10:
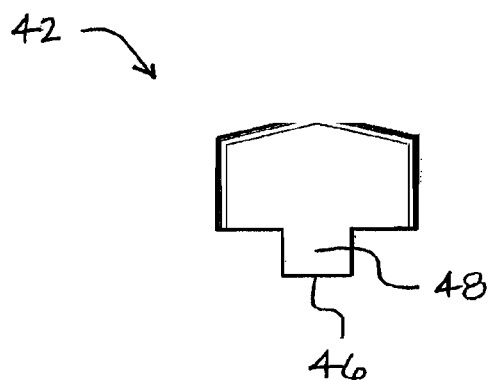
FIG. 10 is a section view of a horizontal cap for covering an upper edge of the modular wall system as represented in phantom in FIG. 9.
Figure 9:
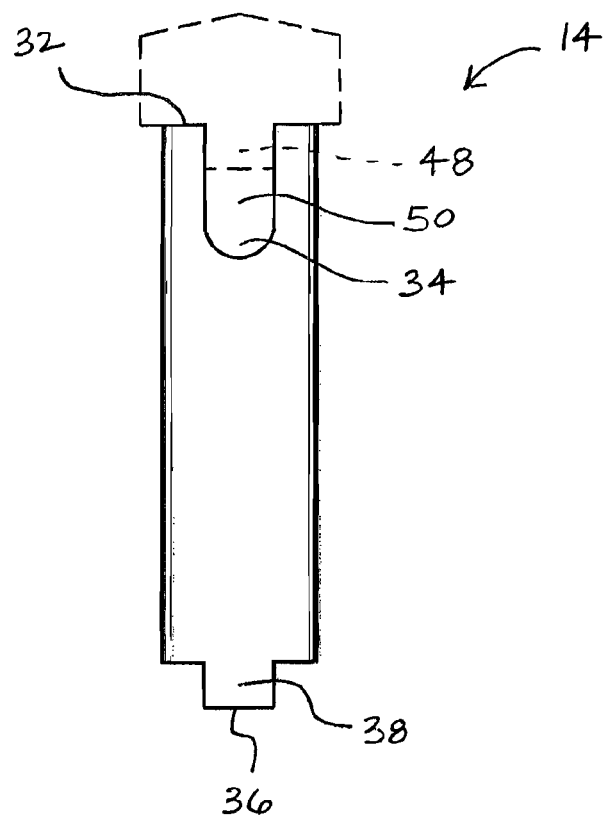
FIG. 9 is a section view of a horizontal panel of the modular wall system showing a rounded keyway and a key in accordance with the present invention.

As shown in FIGS. 3 and 4, at least one of the opposite vertical edges 16A, 16B of the horizontal panels 14 may include a tongue 26 for engagement with the groove 20 (detailed in FIG. 18) of each of the vertical members 18. Similarly, and as shown in FIGS. 5 and 6, at least one of the opposite vertical edges 16A, 16B of the horizontal panels 14 includes a tongue 26 and defines a groove 28 for engagement with the groove 20 and a tongue 28 (detailed in FIG. 20) of each of the vertical members 18. FIGS. 3-6 further illustrate a fastening device 30A, 30B to help secure components together.

Furthermore, one of the vertical edges 16A of each of the horizontal panels 14 may define a groove 28 and the opposite vertical edge 16B of each of the horizontal panels 14 may include a tongue 26 for engagement with a respective groove 28 of another of the horizontal panels 14 in a horizontally-aligned configuration. A variety of interlocking configurations may be utilized to engage the ends 16A, 16B of the horizontal panels to the vertical members 18, and also to engage the ends 16A, 16B of the horizontal panels 14 to each other. A vertical cover may be used to cover the seam between two interlocking horizontal panels 14. Such vertical covers give the modular wall system 10 a finished appearance, and typically comprise a version of what is referred to herein (described below with reference to FIGS. 11 and 12) as closed cell foam pilaster panels. Alternatively, such vertical covers may be made from "synthetic lumber" materials, i.e., ground, colored, mixed, and recycled thermoplastic materials molded, extruded, or machined into desired shapes.

A depth of the grooves 28 of the vertical edges 16A may be greater than a height of the tongues 26 of the vertical edges 16B, thereby defining a vertical conduit (not shown) disposed within the modular wall system 10. Such conduits may contain electric, fiber optic, television cable, phone, water, air, gas, or other utility lines to feed a variety of appliance features, as desired. For example, lights mounted on the top of the modular wall system or at the base of the modular wall system may be energized by fiber optic lines run throughout conduits within the modular wall system 10.

An upper horizontal edge 32 of each of the horizontal panels 14 defines an upper horizontal keyway 34. A lower horizontal edge 36 of each of the horizontal panels 14 includes a lower horizontal key 38 for engagement with a respective upper horizontal keyway 34 of another of the horizontal panels 14 in a vertically-stacked configuration. The depth of the upper horizontal keyways 34 is greater than the height of the lower horizontal keys 38, thereby defining a horizontal conduit (not shown) disposed within each of the horizontal panels 14. The function of such conduits is the same as that of the above-described vertical conduits. The inside surface of the keyway may be square (FIGS. 3 and 7), rounded (FIGS. 5 and 9), or any other shape that will result in a suitable void to define the conduit.

The support base 12 is constructed like conventional footings, typically from conventional concrete materials. Each of the horizontal panels 14 may include vertical anchors (not shown) protruding from a lower horizontal edge 40 thereof and the support base 12 defines bores (not shown) for receiving the respective vertical anchors. Such vertical anchors may be molded into the horizontal panels 14 during manufacturing of the horizontal panels 14, or they may be installed during construction of the modular wall system 10.

The modular wall system 10 further includes horizontal caps 42 covering an upper horizontal edge 44 of the modular wall system 10, as shown in FIG. 2. FIGS. 5 and 7-10 illustrate that a lower horizontal edge 46 of each of the horizontal caps 42 has a lower key 48 for engagement with the upper keyway 34 of an uppermost of the horizontal panels 14. Such horizontal caps 42 give the modular wall system 10 a finished appearance, and are typically made from "synthetic lumber" materials, i.e., ground, colored, mixed, and recycled thermoplastic materials molded, extruded, or machined into desired shapes. Such horizontal caps 42 may also be thermoformed or vacuum formed from thermoplastic materials.

The depth of the upper horizontal keyway 34 of the modular wall system 10 is greater than the height of the lower key 48 of the horizontal cap 42, thereby defining a horizontal conduit 50 disposed along a top portion 44 of the modular wall system 10. The function of such conduits 50 is the same as that of the above-described vertical conduits.

Figure 11:
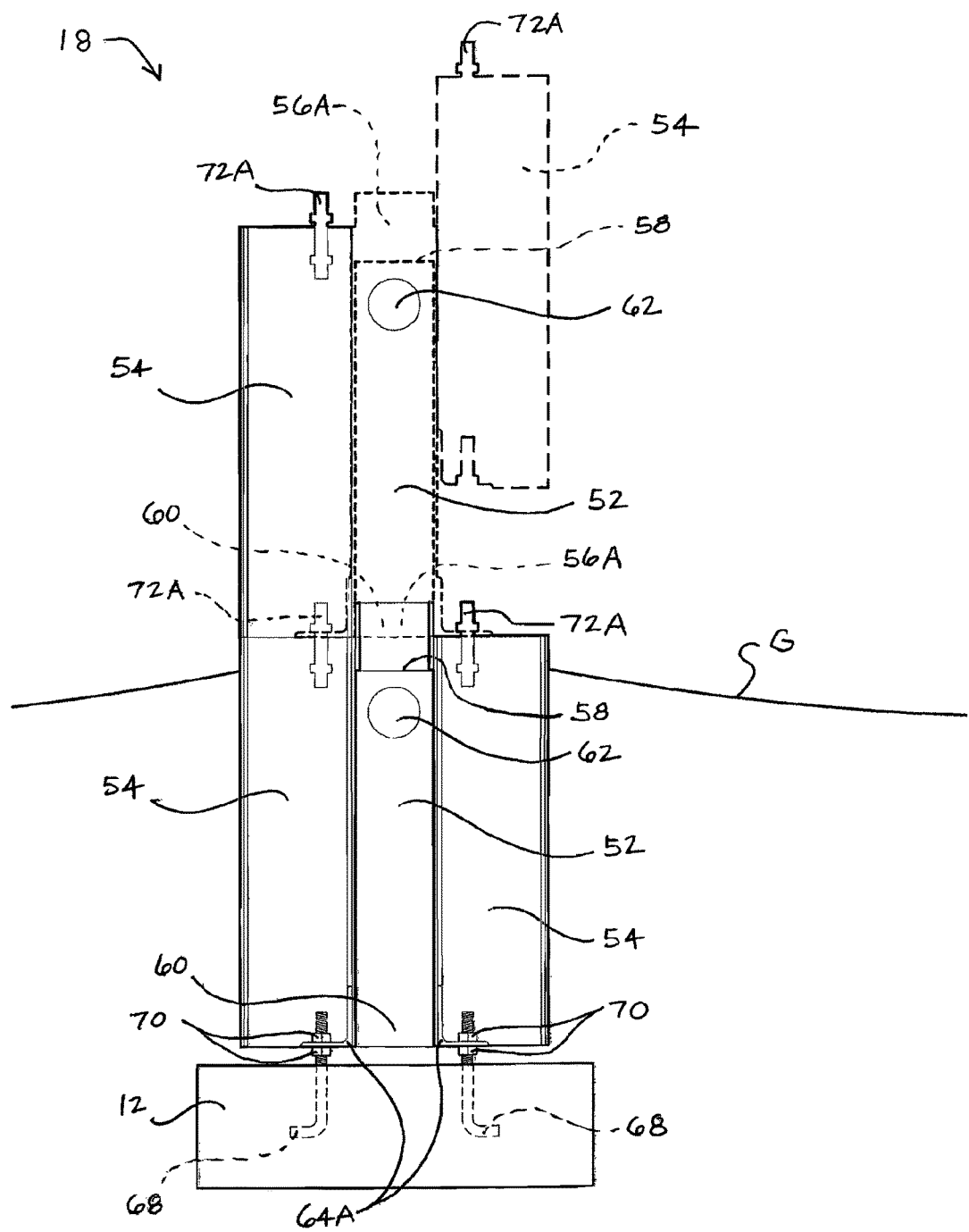
FIG. 11 is a section view of a vertical member of the modular wall system mounted to a support base and showing a structural vertical member covered by pilaster panels in accordance with the present invention.
Figure 12:
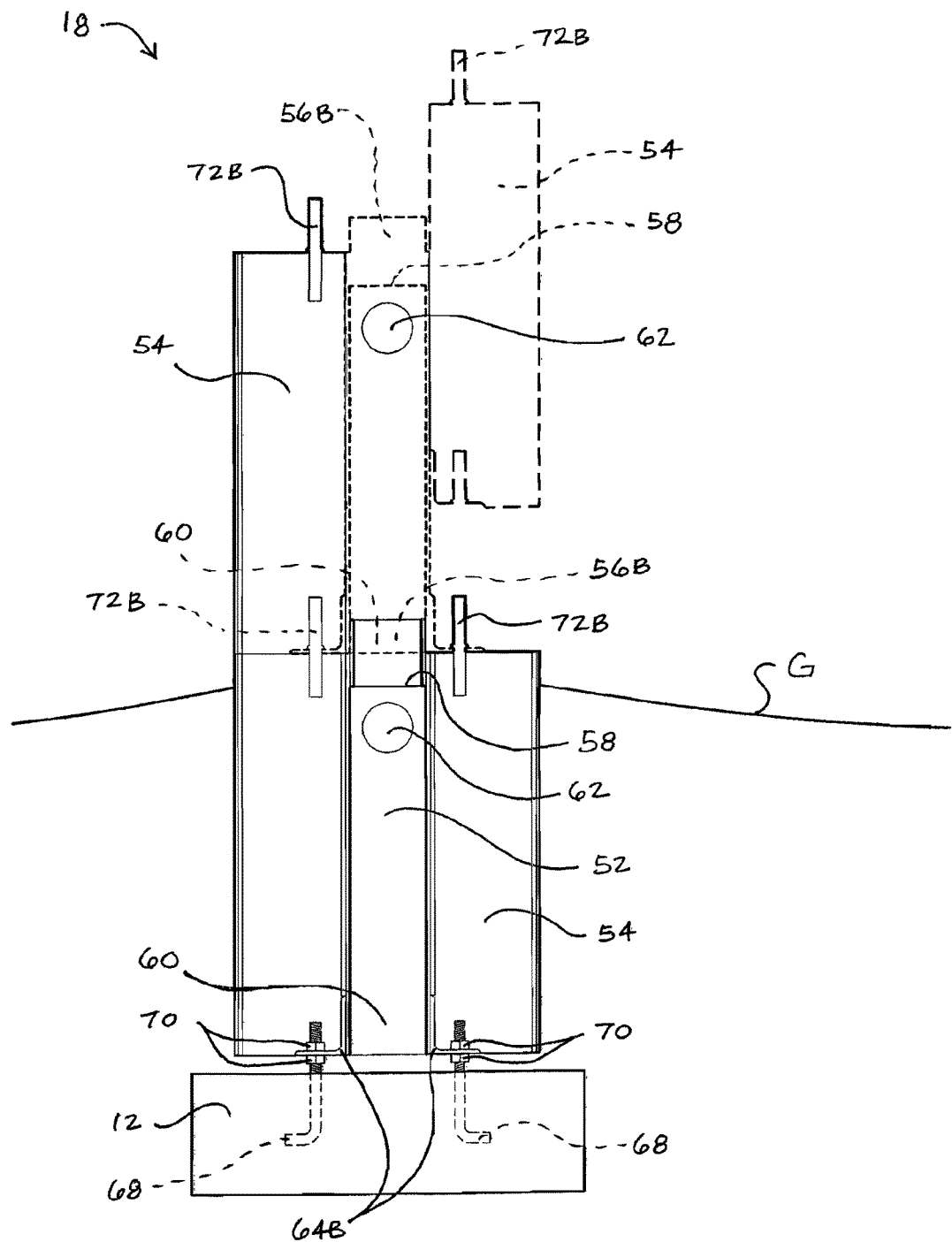
FIG. 12 is a section view of an alternative installation method of the vertical member of FIG. 11.

Referring to FIGS. 11 and 12, the vertical members 18 are typically constructed from a structural vertical member 52 and pilaster panels 54 covering the structural vertical member 52. At least one of the pilaster panels 54 may define a groove 28 for receiving one of the opposite vertical edges 16A, 16B of one of the horizontal panels 14, as described with reference to FIGS. 3 and 4. Similarly, at least one pilaster panel 54 on each of the vertical members 18 may have a tongue 20 and define a groove 28, each for engaging a respective one of the groove 28 and tongue 20 of one of the opposite vertical edges 16A, 16B of one of the horizontal panels 14, as described above with respect to FIGS. 5 and 6. As described above, a variety of interlocking configurations may be utilized to engage the ends of the horizontal panels 14 to the vertical members 18.

Further to a variety of interlocking configurations, the modular wall system 10 may also include fastener devices 30A, 30B that secure the horizontal panels 14 to the pilaster panels 54, and/or to secure the horizontal panels 14 to each other. The fastener devices 30A, 30B represented in the figures are "twist-lock" fasteners or cam-locks, but the present invention may include any fastening device that achieves the desired securing feature.

Figure 14:
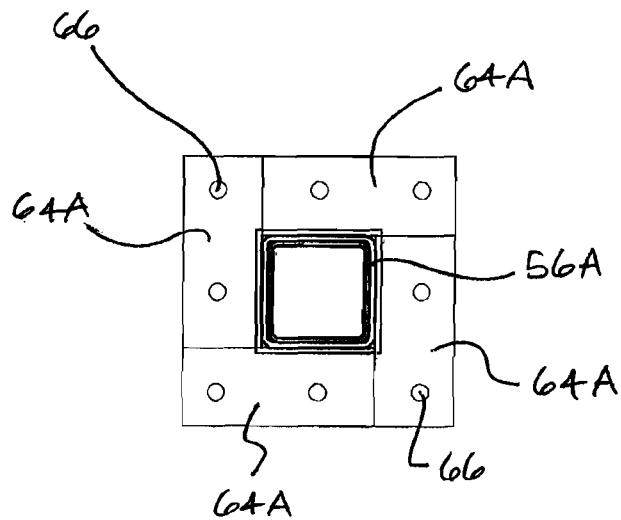
FIG. 14 is a plan view of the structural vertical member of FIG. 13.
Figure 13:
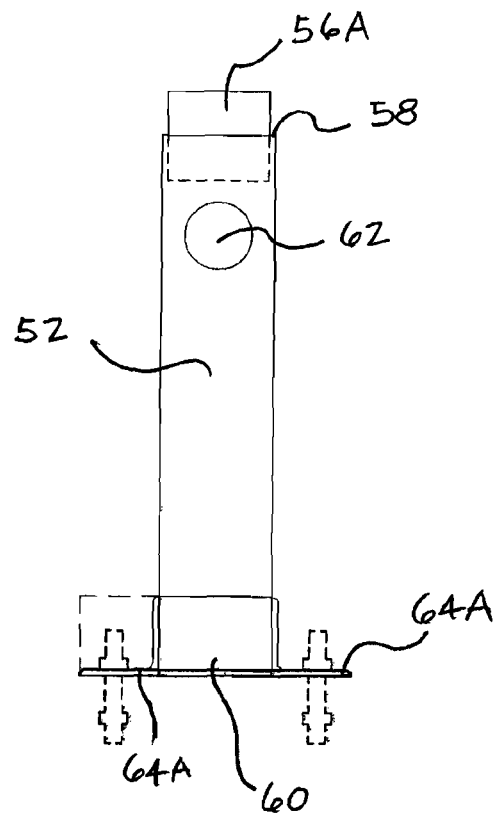
FIG. 13 is a side elevation of a structural vertical member of the vertical member of FIG. 11 showing a bayonet projection at an upper end thereof and horizontal flanges at a bottom end thereof.

As shown in FIGS. 14 and 17, the structural vertical members 52 are hollow. FIGS. 11, 13, and 14 illustrate one bayonet projection 56A projecting upwards from the upper end 58 of the structural vertical member, and FIGS. 12 and 15-17 illustrate two bayonet projections 56B (one is hidden in FIGS. 12 and 16) projecting upwards from the upper end 58 of the structural vertical member 52. The bayonets 56A, 56B are configured for engagement with the hollow lower end 60 of another structural vertical member 52 during a vertically-stacked configuration of the vertical members 18, as shown in FIGS. 11 and 12. The present invention may include any number of bayonet projections or similar type of projection(s) suitable to support a vertically-stacked configuration.

The structural vertical members 52 may define a horizontal aperture 62 in communication with a conduit 50 defined within the modular wall system 10, as previously described. More specifically, utility lines may extend axially through the hollow structural vertical members 52, through the horizontal aperture 62, and through a conduit 50 or any of the other conduits described above to feed a variety of appliance features mounted on or near the modular wall system 10, as desired. Although shown toward the upper end 58 of the structural vertical member 52 in FIGS. 11, 12, 13, and 15, the location of the horizontal aperture 62 may be anywhere along the height of the structural vertical member 52 to accommodate a variety of conduit configurations. Similarly, a structural vertical member 52 may define more than one horizontal aperture 62 in communication with a variety of conduits, as desired.

Figure 26:
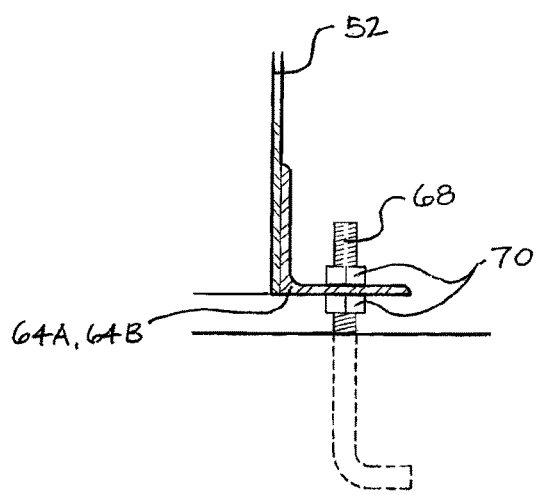
FIG. 26 is a detail section view of an attachment of the vertical members of FIGS. 11 and 12 to their respective support bases.

FIGS. 13-17 show that each of the structural vertical members 52 includes horizontal flanges 64A, 64B (four in FIGS. 11, 13, and 14, and two in FIGS. 12 and 15-17) at the bottom end 60 thereof. The horizontal flanges 64A, 64B include apertures or holes 66. Bolts 68 protrude upwardly from the support base 12, as represented in FIGS. 11 and 12. Each of the bolts 68 protrudes though a respective one of the holes 66 of the horizontal flanges 64A, 64B of the lowermost structural vertical members 52. Adjustment nuts 70 are threaded onto each of the bolts 68, wherein rotation of the adjustment bolts 70 adjusts the height of the respective structural vertical member 52, thereby leveling the modular wall system 10. In other words, rotation of the adjustment bolts 70 causes the respective flanges 64A, 64B to travel up and down the bolts 68 which are secured to the support base 12. The flanges 64A, 64B are part of the structural vertical members 52. Thus, the structural vertical support members 52 move in conjunction with the flanges 64A, 64B, and the interconnected pilaster panels 54 and horizontal panels 14 move accordingly. This feature enables proper leveling of the modular wall system 10. A detail view of the attachment configuration is shown in FIG. 26.

Figure 18:
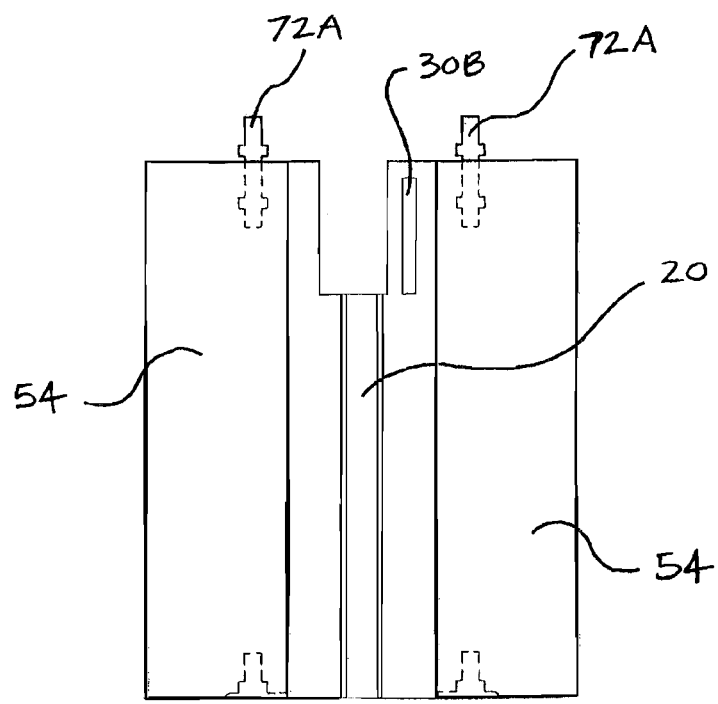
FIG. 18 is a partial end elevation of the pilaster panels of FIG. 11 with a horizontal panel removed for the sake of clarity.
Figure 20:
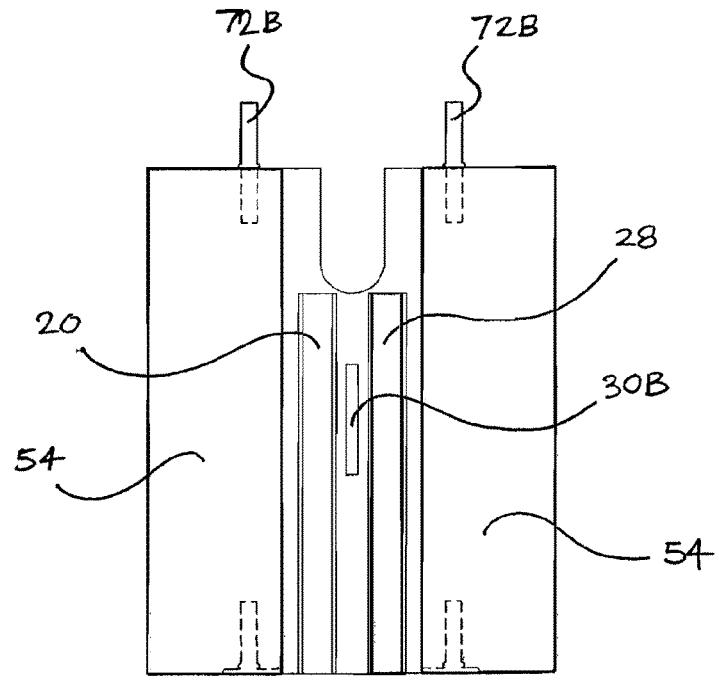
FIG. 20 is a partial end elevation of the pilaster panels of FIG. 12 with a horizontal panel removed for the sake of clarity.
Figure 22:
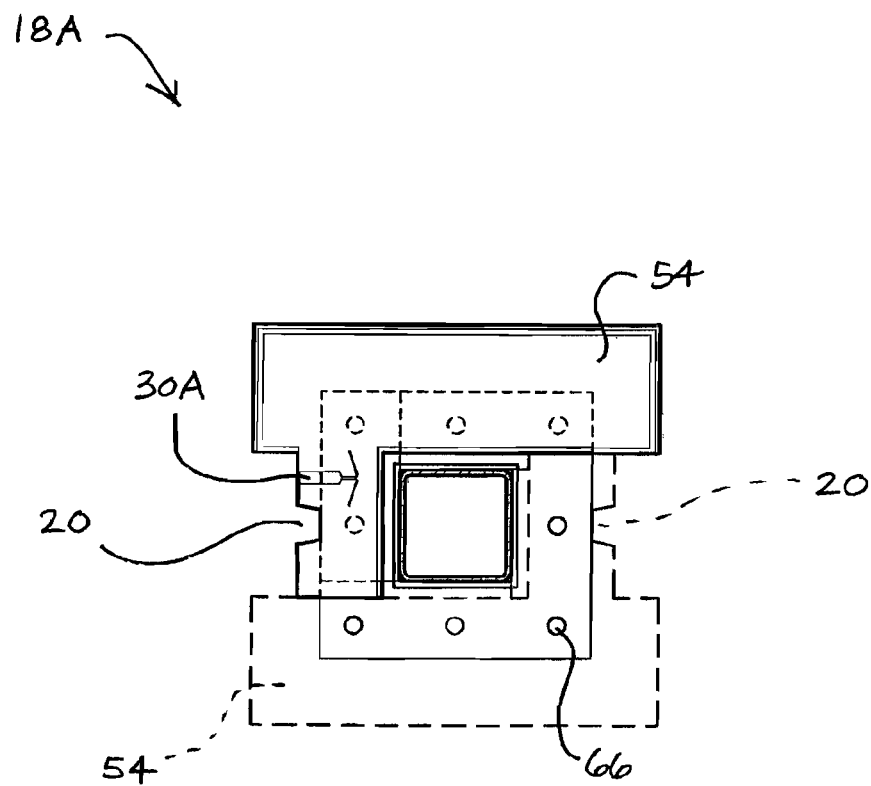
FIG. 22 is a plan section view of the vertical member of FIG. 11 at a mid-section of the modular wall system in accordance with the present invention.
Figure 27:
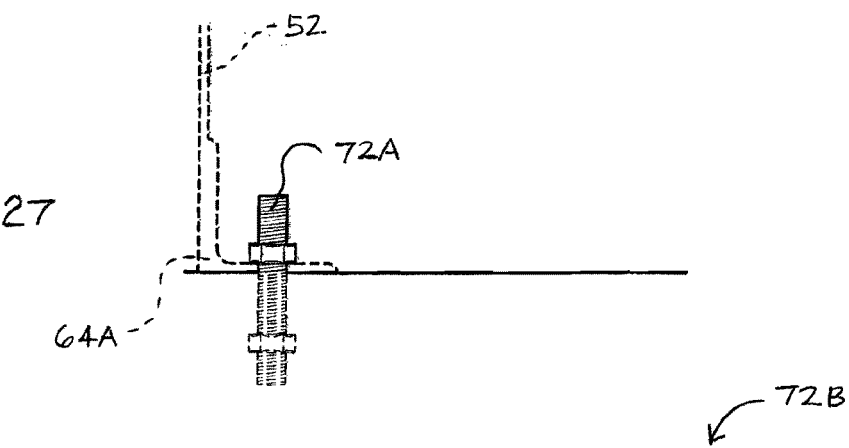
FIG. 27 is a detail section view of a locking pin for use in a vertically-stacked configuration of the vertical member of FIG. 11.
Figure 28:
FIG. 28 is a detail section view of a locking pin for use in a vertically-stacked configuration of the vertical member of FIG. 12.

Referring to FIGS. 18 and 20, locking pins 72A, 72B may protrude upwardly from each of the pilaster panels 54, through a respective hole 66 of the horizontal flanges 64A, 64B of the structural vertical members 54, and into a respective pilaster panel 54, during a vertically-stacked configuration of the vertical members, as shown in FIGS. 11 and 12. Detail views of the locking pins 72A, 72B are shown in FIGS. 27 and 28, respectively.

Figure 19:
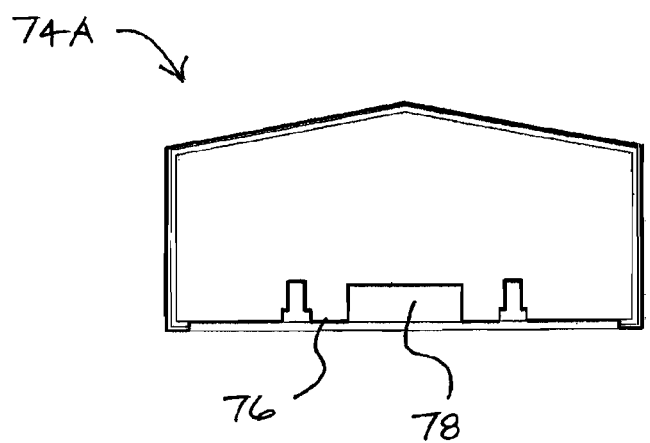
FIG. 19 is a section view of a pilaster cap for covering an upper edge of the vertical member of FIG. 11.
Figure 21:
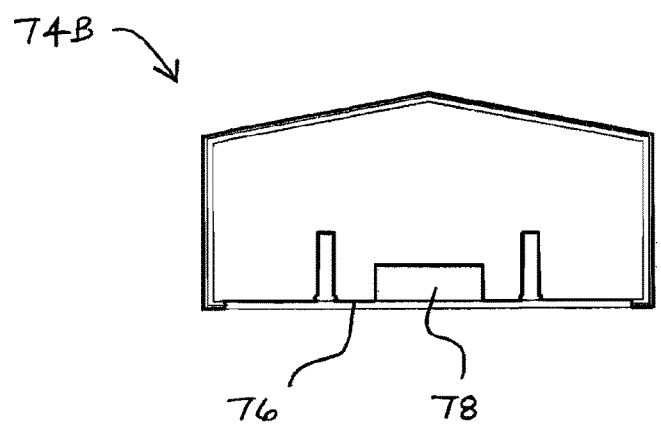
FIG. 21 is a section view of a pilaster cap for covering an upper edge of the vertical member of FIG. 12.

The modular wall system 10 further includes pilaster caps 74A, 74B (detailed in FIGS. 19 and 21) covering an upper end 58 of each of the vertical members 18, as shown in FIG. 1. The locking pins 72A, 72B may protrude upwardly from each of the pilaster panels 54 and into a respective pilaster cap 74A, 74B. A lower horizontal surface 76 of each of the pilaster caps 74A, 74B comprises an indentation 78 for engagement with the bayonet projection(s) 56A, 56B of the structural vertical members 52. The pilaster cap 74A of FIG. 19 is configured to cover the vertical support 18 of FIG. 11, and the pilaster cap 74B of FIG. 21 is configured to cover the vertical support 18 of FIG. 12. Similar to the above-described horizontal caps 42, such pilaster caps 74A, 74B give the modular wall system 10 a finished appearance, and are typically made from "synthetic lumber" materials, i.e., ground, colored, mixed, and recycled thermoplastic materials molded or machined into desired shapes. Such pilaster caps 74A, 74B may also be thermoformed or vacuum formed from thermoplastic materials.

The vertical members 18 may be configured in a variety of arrangements to accommodate different wall configurations. For example, the vertical member 18A represented in FIGS. 22 and 25 accommodates a straight connection between two horizontal panels 14 of a modular wall system 10. More specifically, the shapes of the pilaster panels 54 in this straight arrangement engage the tongue 26 (FIGS. 3, 4, and 22) or tongue 26 and groove 28 (FIGS. 5, 6, and 25) of horizontal panels 14 horizontally aligned in a straight configuration, as shown in FIGS. 1 and 2.

Figure 23:
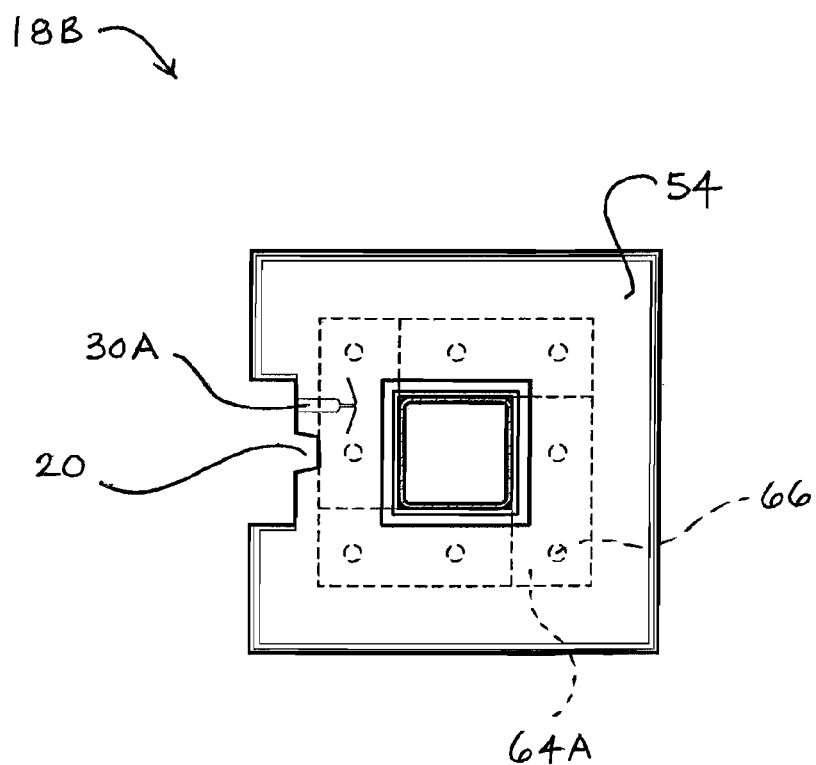
FIG. 23 is a plan section view of the vertical member of FIG. 11 at an end-section of the modular wall system in accordance with the present invention.

Similarly, the vertical member 18B represented in FIG. 23 accommodates an end of a modular wall system 10. More specifically, the shape of the pilaster panel 54 in this end arrangement engages the tongue 26 of the horizontal panel 14 of FIGS. 3 and 4. An alternate shaped pilaster panel 54 (not shown) in this end arrangement could engage the tongue 26 and groove 28 of the horizontal panel 14 of FIGS. 5 and 6.

Figure 24:
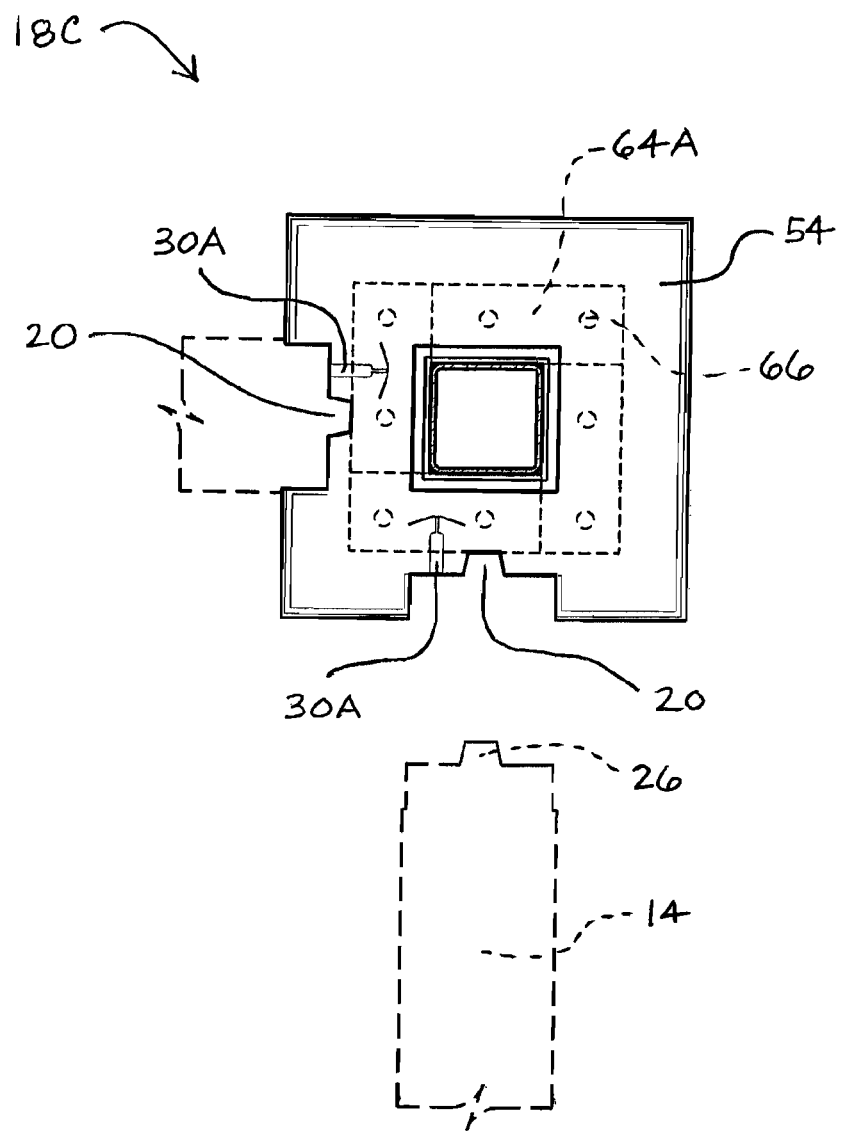
FIG. 24 is a plan section view of the vertical member of FIG. 11 at a corner-section of the modular wall system in accordance with the present invention.
Figure 25:
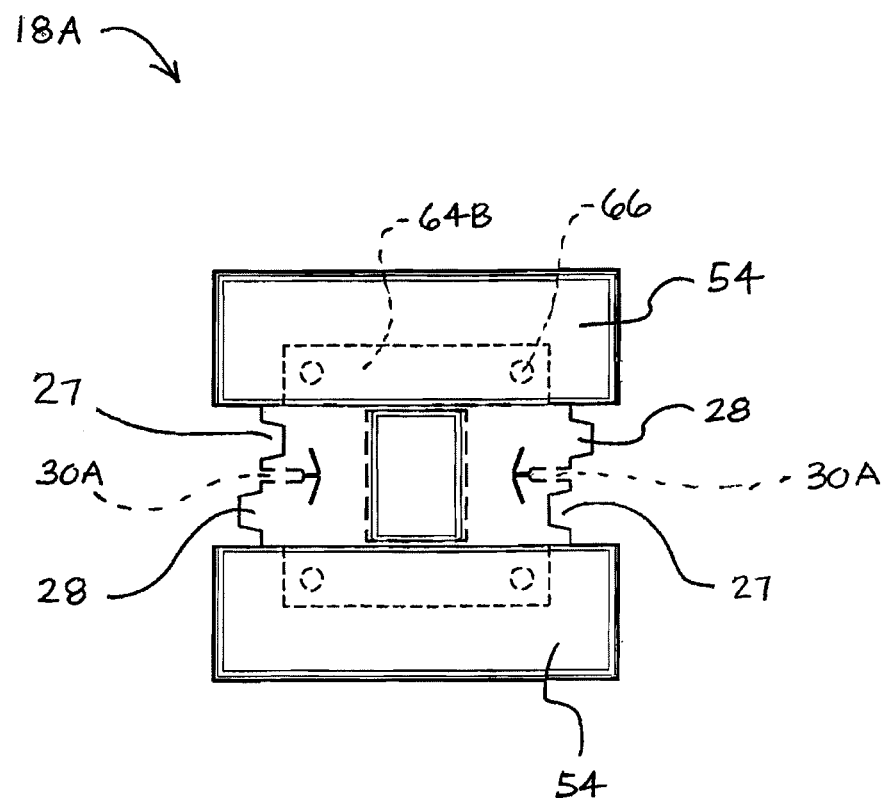
FIG. 25 is a plan section view of the vertical member of FIG. 12 at a mid-section of the modular wall system in accordance with the present invention.

Alternatively, the vertical member 18C represented in FIG. 24 accommodates a corner of a modular wall system 10. More specifically, the shape of the pilaster panel 54 in this corner arrangement engages the tongue 26 of the horizontal panel 14 of FIGS. 3 and 4. An alternate shaped pilaster panel 54 (not shown) in this corner arrangement could engage the tongue 26 and groove 28 of the horizontal panel 14 of FIGS. 5 and 6. The present invention is not limited to a corner vertical member 18C with an angle of 90° as represented in FIG. 24, and may include corner vertical members comprising a variety of angles to suit a variety of modular wall system 10 configurations.

Similarly, the present invention is not limited to flat horizontal panels 14, and may include rounded horizontal panels comprising a variety of curvatures to suit a variety of modular wall system 10 configurations.

The horizontal panels 14 and the pilaster panels 54 are constructed from a closed cell foam panel 80 sandwiched between two moisture-resistant laminate skins 82. For the sake of clarity, these features are labeled in FIG. 7 only. In addition to the conduits 50 defined between mating components (as described above), the horizontal panels 14 may define conduits molded therein. The closed cell foam 80 provides sound absorption and thermal insulation, as desired. The moisture-resistant laminate skins 82 are typically textured and composed of a rigid polymer vinyl film such as polyvinyl chloride (PVC) with a thickness of about 0.010-inch to 0.050-inch such as PENTALAN SF M 254/04. The PVC film is an ultra-violet-enhanced material specially formulated for outdoor use.

The decorative layer 22 may be a film layer laminated on the moisture-resistant laminate skins 82 with an adhesive system such as, for example, adhesives made by Bostik. Alternatively, the decorative layer 22 may be bonded directly to the exterior surfaces 24 of the horizontal panels 14 and the vertical members 18.

The decorative layer 22 may be an image of rock, stone, brick, concrete, concrete block, stucco, terracotta, wood, metal, or other natural or synthetic materials and finishes. The laminated decorative layer 22 may be replaced or changed to an alternate image resulting in a completely new appearance for an existing modular wall system 10. Similarly, a modular wall system 10 in accordance with the present invention may have different decorative layers 22 resulting in a stone-looking exterior and a brick-looking interior.

The laminated layer 22 is typically composed of an acrylic outer film with a thickness of about 0.002-inch to 0.020-inch that is reverse-side printed such as Solarkote®, Kynar®, or Korad® acrylic film, but may be composed of any digital imaging material in any thickness suitable for achieving the above-described functions.

The horizontal wall panels 14 are typically 2-feet high, 6 to 8-feet long, and 4 to 6-inches thick for ease of handling. As described above, the horizontal panels 14 may be vertically stacked to increase the overall height of the modular wall system 10. The present invention is not limited to these dimensions, however, and the horizontal panels 14 may range from 4-feet, 6-feet, or 8-feet high, 4-feet long, and 8-inches thick or any other dimensions as desired for a particular application. For example, a desirable configuration for a garden wall may be 2-feet high, while one for a property wall or security divider may be 6-feet high.

The modular wall system 10 may also include doors, as desired. The construction and properties of the doors is virtually identical as those described above with respect to the horizontal panels 14, with a difference in the hardware required for hinging and securing a door that opens and closes within a wall structure. It may be desirable for a door to include a decorative layer 22 different from that of the surrounding wall. When a door interrupts a conduit passage, the conduit may extend underground below the door opening.

The modular wall system 10 of the present invention is lightweight, easy to install and maintain, versatile (e.g., the material appearance can be easily changed, as desired), and cost effective. The configuration of the modular wall system 10 can be adapted to suit specific needs, i.e., different heights and lengths of various wall sections are easily achieved, as well as the shapes of the various wall sections (straight walls, angled corners, curved walls, etc.).

Manufacturing Process for Preparing Printed Panels

In a further embodiment, the following process describes a sequence of materials and process steps required to form panels that have thermoformed 3D surfaces. In one embodiment, the decorative layer comprises a realistic 4 color laminated digital photograph that could be of stone or another media surface.

A—Preparing the Thermoforming Sheet Materials

1—Provide white (or other color) ABS (or other plastic) preferably 0.030" to 0.090" thick thermoform-able laminate skin.

2—Using to-scale 2D color images, prepare the image to be converted to create a 3D image and 3D thermoforming mold top surface by either 2A or 2B below. This will create a converted adjusted distortion-print 4 color wall image.

2A—MANUAL PREPARATION PROCESS. Create a "Bump Map" surface pattern by digitally hand painting—or through using digital image filters to adjust the "bump map"—a grey scale image overlay on top of the 2D color photo. This manual method results in defining the high and low areas of the 3D surface. In this way, the high and low areas become the hills and valleys of the surface. These are the surface contours similar to a topographic map that describe the elevation changes.

2B—AUTOMATED PREPARATION PROCESS. Using a 3D camera, collect the photographic 3D digital surface data that defines, using photographic information, the high and low surface areas of the actual 3D stone wall surface.

3—Using either the 2A or 2B steps, print the converted adjusted distortion-print 4 color wall image on to a preferably 0.030" to 0.090" ABS and/or 0.001" to 0.020" thick clear matte finish acrylic film such as Solar Cote in reverse on the inside smooth surface of the film using a preferably Gravure printing process. This produces a printed sheet.

4—Take the reverse printed film or printed ABS sheet and thermally laminate it to the unformed thermoplastic sheet or unprinted thermoplastic film from STEP 1, trapping the printed ink image surface between the thermoplastic sheet and inside surface of the clear printed film. Preferably, alignment targets have been provided to register the printed and laminated film image over the 3D thermoform mold surface such that the printed images match and mate to the 3D mold surface (see step 5). When the printed sheet is ABS, this step may be optional.

B—Making the Thermoforming Mold

5—Using the digital data from step 2, create a 3D digital data file that can be read on 5-axis mold machining equipment.

6—Cut the 3D mold surface that matches the adjusted and converted 2D photo data resulting in producing a thermoforming mold shaped to produce 3D thermoformed panel sheets.

C—Thermoforming STONEWALL Panel Sheets

7—Align and register the thermoplastic printed panel sheet to the mold in the thermoforming machine. Set the machine to form the sheet with minimum distortion. The thermoforming process produces a thermoformed 3D printed panel sheet that can be used to become surfaces of interior or exterior decorative walls, dividers or space separators.

While the preferred embodiments of the invention have been described in detail above, the invention is not limited to the specific embodiments described which should be considered as merely exemplary. Further modifications and extensions of the present invention may be developed and all such modifications are deemed to be within the scope of the present invention as defined by the appended claims.

The invention claimed is:

1. A method for forming a wall system comprising:
preparing a 2 dimensional image for application of the 2D image to a 3D surface to create a converted adjusted distortion-print image;
preparing a bump map surface pattern that defines high and low areas for the converted adjusted distortion-print image;
printing the converted adjusted distortion-print image onto an Acrylonitrile Butadiene Styrene (ABS) sheet;
attaching the ABS printed sheet to a clear film to form a printed sheet;
aligning the printed sheet within a mold that has a shape determined using the converted adjusted distortion-print image;
molding, using thermoforming, the aligned printed sheet within the mold to form a 3D printed decorative panel; and
applying the printed decorative panel to a horizontal foam panel to form a wall.

2. The method of forming a wall system of claim 1, wherein the image is a 3 dimensional photograph.

3. The method of forming a wall system of claim 1, wherein targets on the printed sheet assist in the alignment step by locating the sheet with respect to the mold.

4. The method of forming a wall system of claim 1, wherein the bump map is prepared using a hand painting method.

5. The method of forming a wall system of claim 1, wherein the hump map is a grayscale image that defines the surface contours of the image.

6. The method of forming a wall system of claim 5, wherein the bump map is formed using digital filters.

7. The method of forming a wall system of claim 6, wherein the image is a 3D image.

8. The method of forming a wall system of claim 1, wherein the printing is done using a Gravure printing process.

9. The method of forming a wall system of claim 1, further comprising using the converted adjusted-distortion image to create a 3D file that can be used by 3D mold machining equipment to create the mold for use in the molding step.

* * * * *